US008766609B2

(12) United States Patent
Babasaki et al.

(10) Patent No.: US 8,766,609 B2
(45) Date of Patent: Jul. 1, 2014

(54) POWER SUPPLY CONTROLLER INCLUDING AN ANOMALY MONITOR

(75) Inventors: Tomohiro Babasaki, Yokkaichi (JP); Seiji Takahashi, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 107 days.

(21) Appl. No.: 12/937,597

(22) PCT Filed: Apr. 17, 2009

(86) PCT No.: PCT/JP2009/057729
§ 371 (c)(1),
(2), (4) Date: Nov. 1, 2010

(87) PCT Pub. No.: WO2009/128525
PCT Pub. Date: Oct. 22, 2009

(65) Prior Publication Data
US 2011/0043180 A1    Feb. 24, 2011

(30) Foreign Application Priority Data

Apr. 17, 2008  (JP) .................... 2008-107938

(51) Int. Cl.
*G05F 1/565*  (2006.01)
*H02M 3/156*  (2006.01)

(52) U.S. Cl.
USPC .......................................... 323/275; 323/351

(58) Field of Classification Search
USPC ......... 323/282–284, 315, 349, 351, 234, 237, 323/265, 273–275
See application file for complete search history.

(56) References Cited

U.S. PATENT DOCUMENTS

| 6,674,657 B2 * | 1/2004 | Nagaya et al. ................... 363/50 |
| 6,825,642 B2 * | 11/2004 | Brooks ......................... 323/272 |
| 6,985,343 B2 | 1/2006 | Mirowski et al. |

(Continued)

FOREIGN PATENT DOCUMENTS

| JP | A 2000-315588 | 11/2000 |
| JP | A 2001-88606 | 4/2001 |

(Continued)

OTHER PUBLICATIONS

International Search Report issued in corresponding International Application No. PCT/JP2009/057729, mailed Jul. 14, 2009. (with English-language translation).

(Continued)

*Primary Examiner* — Adolf Berhane
*Assistant Examiner* — Jeffrey Gblende
(74) *Attorney, Agent, or Firm* — Oliff PLC

(57) ABSTRACT

A power supply controller includes: a controlling section that, upon determination that no anomaly has occurred, causes a semiconductor switch to execute turning on and, upon determination that the anomaly has occurred, causes the semiconductor switch to maintain an off state; a monitoring section that monitors which condition the controlling section is in, the condition being normal or anormal; and a switching section that, upon monitoring result by the monitoring section indicating the normal condition, causes turning on and off of the semiconductor switch by the controlling section and, upon the monitoring result indicating the anormal condition, causes turning on and off of the semiconductor switch with an external on-off command signals.

8 Claims, 4 Drawing Sheets

(56) References Cited

U.S. PATENT DOCUMENTS

| | | | |
|---|---|---|---|
| 7,701,187 B2* | 4/2010 | Manabe et al. | 323/283 |
| 8,410,745 B2* | 4/2013 | Hosoda et al. | 318/801 |
| 2002/0101224 A1* | 8/2002 | Rozsypal | 323/282 |
| 2004/0095104 A1 | 5/2004 | Brooks | |
| 2007/0146951 A1* | 6/2007 | Takahashi et al. | 361/93.1 |
| 2008/0002325 A1 | 1/2008 | Kato et al. | |
| 2008/0048877 A1* | 2/2008 | Takahashi | 340/653 |
| 2009/0128106 A1 | 5/2009 | Takahashi et al. | |
| 2011/0043180 A1 | 2/2011 | Babasaki et al. | |

FOREIGN PATENT DOCUMENTS

| | | | |
|---|---|---|---|
| JP | A 2009-126413 | 6/2009 | |
| WO | WO 2006/059646 A1 | 6/2006 | |
| WO | WO 2006/129548 A1 | 12/2006 | |

OTHER PUBLICATIONS

Written Opinion of the International Searching Authority issued in corresponding International Application No. PCT/JP2009/057729, mailed Jul. 14, 2009. (with partial English-language translation).

Jan. 21, 2013 Office Action issued in Chinese Patent Application No. 200980113215.1 (with Translation).

Translation of Jul. 30, 2012 Office Action issued in Chinese Patent Application No. 200980113215.1.

Feb. 13, 2012 Office Action issued in German Patent Application No. 11 2009 000 855.0 (with translation).

* cited by examiner

US 8,766,609 B2

POWER SUPPLY CONTROLLER INCLUDING AN ANOMALY MONITOR

TECHNICAL FIELD

The present invention relates to a power supply controller.

BACKGROUND ART

A power supply controller includes a semiconductor switch to be connected between a power source and a load. The power supply controller turns on/off the semiconductor switch so as to control power supply to the load. Such a power supply controller has a function to protect a load circuit etc. without using any fuse element (see Patent Document 1). Specifically: the power supply controller determines whether overcurrent of equal to or greater than a predate mined value passes through the semiconductor switch; and, upon determination that overcurrent has passed, the power supply controller turns on/off the semiconductor switch. Thereafter, upon occurrence of predetermined cycles of the on-off state, the power supply controller determines that the circuit is short-circuited, and the power supply controller maintains the semiconductor switch in the off state.

[Patent Document 1] Japanese Unexamined Patent Application Publication No. 2000-315588

Problems to be Solved by the Invention

The on-off control of the semiconductor switch is provided by a microcomputer or a control circuit. However, the microcomputer etc. has a risk of anormal conditions such as running out of control. On the other hand, some loads such as vehicle headlamps have extremely high potential for causing hazardous conditions upon turn-off failure. Therefore, generally equipped for such loads is a backup function. With the backup function, the operator can give external instructions to the semiconductor switch to forcibly turn on/off the loads regardless of the control by the microcomputer etc.

However, when attempting to provide the circuit protection function in the power supply controller having the backup function, such a problem arises that the backup function prevents valid activation of the circuit protection function. Namely, with the general backup function, the semiconductor switch can be turned on/off with the external instructions regardless of whether the microcomputer etc. are in the anormal condition or in the normal condition. Accordingly, in the normal condition, even in case of the short-circuiting where the microcomputer etc. maintains the semiconductor switch in the turned-off state, the backup function cancels the turned-off state. Thus, there arises a problem that conduction to the load is allowed despite of the short-circuited condition.

DISCLOSURE OF THE INVENTION

The present invention was accomplished on the basis of the circumstances as described above, and the object is to provide a power supply controller that has a backup function while can validly activate a circuit protection function.

Means for Solving the Problem

A power supply controller in accordance with the invention of claim 1 includes: a semiconductor switch that is turned on and off for controlling power supply from a power source to a load; a determining section that determines whether an anomaly has occurred in the semiconductor switch or in a circuit that is to be provided with the semiconductor switch; a controlling section that, upon determination by the determining section that no anomaly has occurred, causes the semiconductor switch to execute turning on and, upon determination that the anomaly has occurred, causes the semiconductor switch to maintain an off state; a monitoring section that monitors which condition the controlling section is in, the condition being normal or anormal; an input section whereto an on-off command signal is to be externally input; and a switching section that, upon monitoring result by the monitoring section indicating the normal condition, causes turning on and off of the semiconductor switch by the controlling section and, upon the monitoring result by the monitoring section indicating the anormal condition, causes turning on and off of the semiconductor switch with the on-off command signal input to the input section.

EXPLANATION OF REFERENCE CHARACTERS

15 . . . power supply controller;
17 . . . power source;
19 . . . load 19
25 . . . microcomputer (determining section, controlling section);
27 . . . watchdog (monitoring section);
31 . . . input terminal (input section);
41 . . . AND circuit (switching section);
43 . . . OR circuit (switching section);
45 . . . power MOSFET (semiconductor switch); and
S1 . . . signals (on-off command signals).

BEST MODE FOR CARRYING OUT THE INVENTION

A first embodiment in accordance with the present invention will be explained with reference to FIGS. 1 through 4.
(General Configuration of Backup System)

Figure 1:
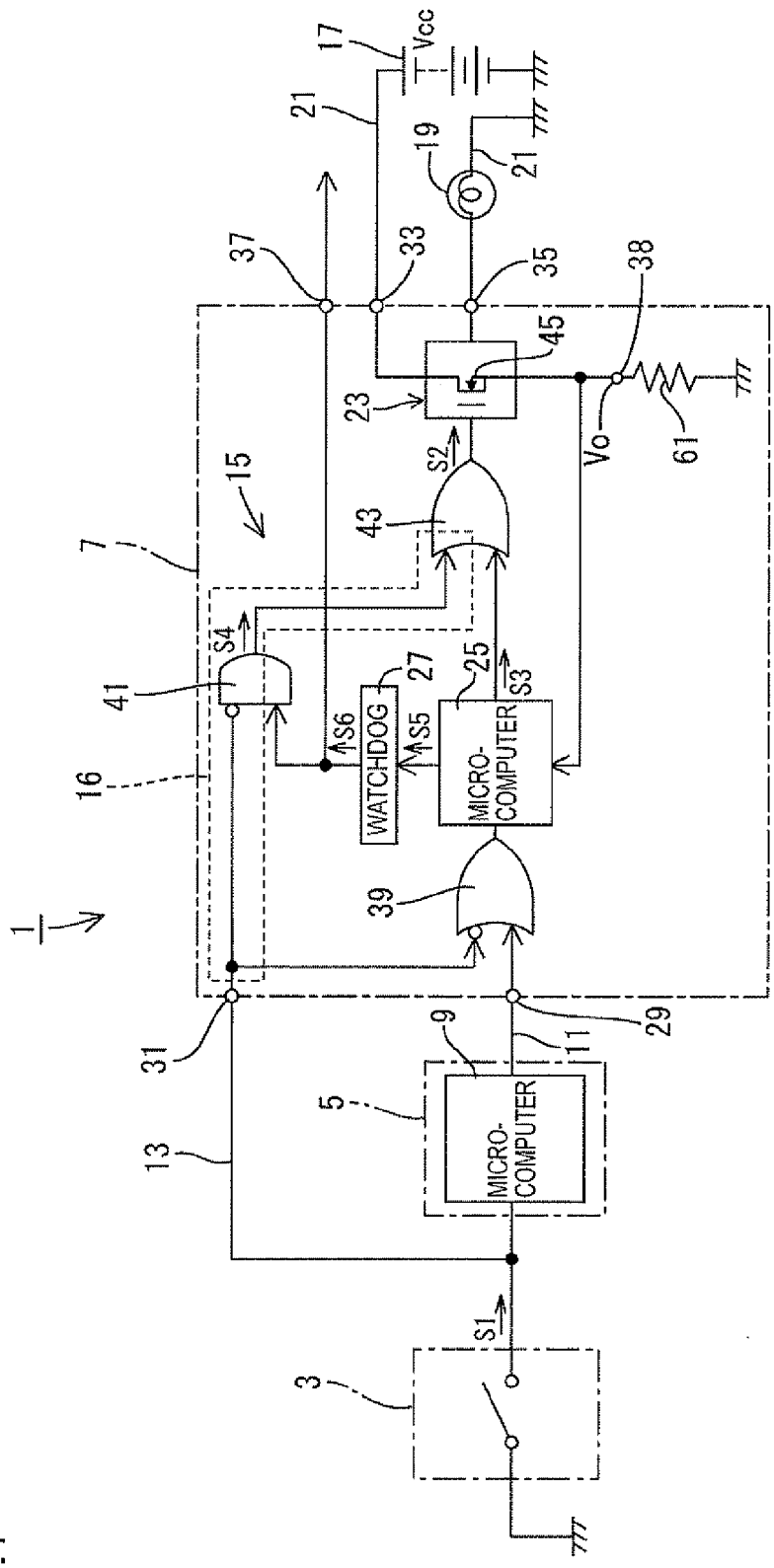
FIG. 1 is a block diagram of general configuration of a backup system of an embodiment in accordance with the present invention.

FIG. 1 is a block diagram of general configuration of a backup system 1 of this embodiment. The backup system 1 is mounted illustratively in a vehicle, not shown. The backup system 1 includes a combination switch 3, a compartment ECU 5 (electronic control unit), and an engine-room ECU 7.

(1) Combination Switch and Compartment ECU

The combination switch 3 is disposed illustratively near a steering wheel (not shown) so as to be turned on/off by the driver gripping the steering wheel. When turned on, the combination switch 3 applies command signals S1 of, illustratively, low level (hereinafter referred to also as ON command signals S1) to the compartment ECU 5. When turned off, the combination switch 3 applies the command signals S1 of high level (hereinafter referred to also as OFF command signals S1) to the compartment ECU 5.

The compartment ECU 5 has a microcomputer 9. The compartment ECU 5 performs total control of the entire vehicle in response to command signals such as the command signals S1 from, for example, a driver's console. The compartment ECU 5 is connected through a LAN cable 11 to the engine-room ECU 7. The command signals S1 from the combination switch 3 are applied through the compartment ECU 5 to the engine-room ECU 7. The output terminal of the combination switch 3 is connected through a switching line 13 directly to the engine-room ECU 7. Thus, even when the compartment ECU 5 is in anormal condition, the engine-room ECU 7 can receive the command signals S1 that directly reflects the driver's input.

(2) Engine-Room ECU

The engine-room ECU 7 includes a power supply controller 15. The power supply controller 15 is used for controlling power supply from a vehicle power source (hereinafter a "power source 17") to a load 19 such as a vehicle headlight and a horn (the headlight is illustrated in the drawings). The term "load" hereinafter represents a device that the power supply controller 15 controls. The term "load" excludes an electric wire 21 connected between the power supply controller 15 and the controlled device. On the other hand, a term "external circuit" includes the load 19 and the electric wire 21.

The power supply controller 15 includes a semiconductor device 23 (an intelligent power device), a microcomputer 25, a watchdog 27, terminals (29, 31, 33, 35, 37, 38), and logic circuits (39, 41, 43).

Figure 2:
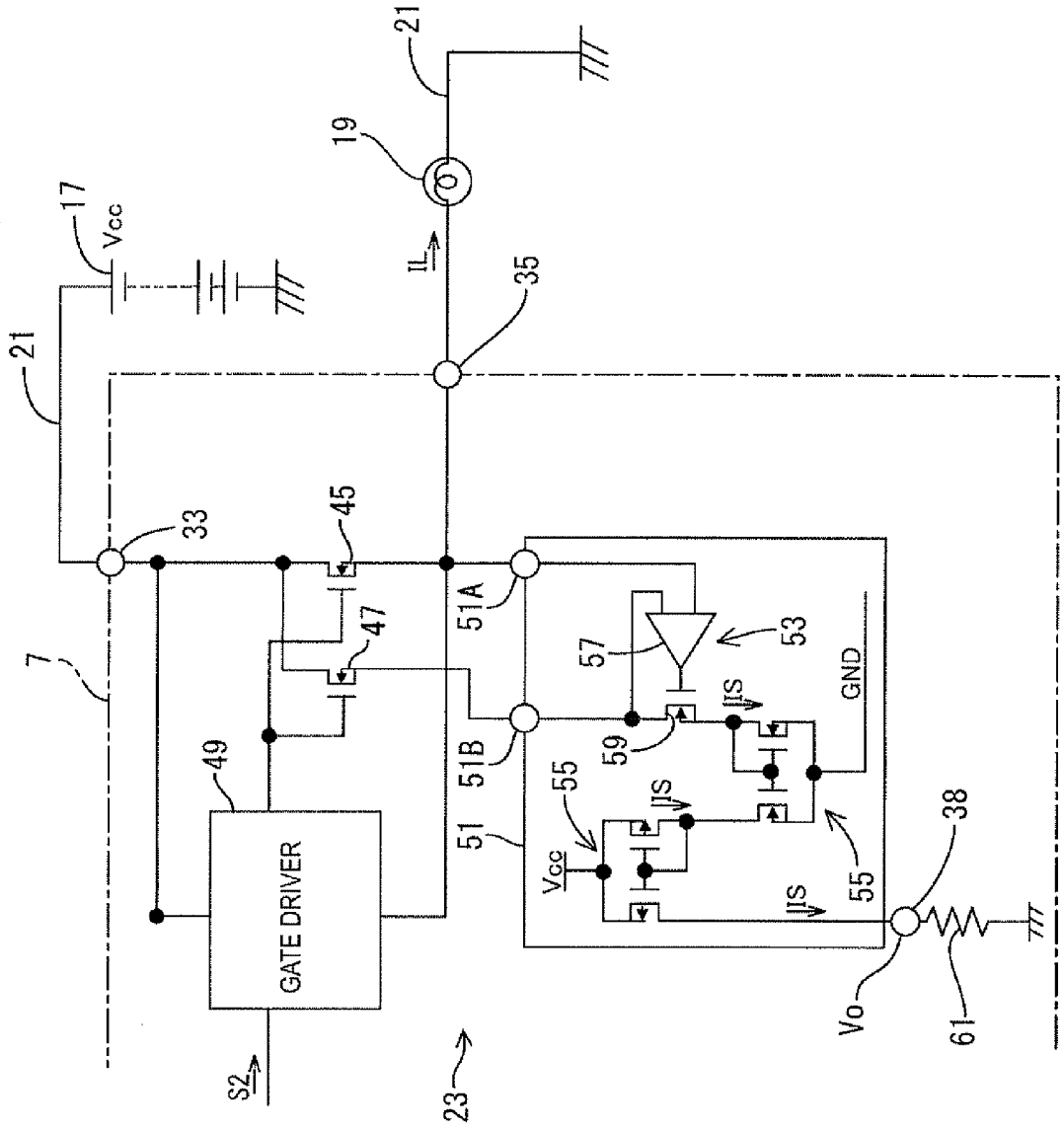
FIG. 2 is a block diagram illustrating internal configuration of a semiconductor device.

FIG. 2 is a block diagram illustrating internal configuration of the semiconductor device 23. The semiconductor device 23 has a power MOSFET 45 (an illustration of a semiconductor switch), a sense MOSFET 47 as a current detecting element (described below), a gate driver 49, and a current mirror section 51. These components are integrated into one chip.

Specifically, a plurality of MOSFETs are arranged on the semiconductor device 23. The drain terminals of the MOSFETs are connected in common to one another and then are connected to the power supply connection terminal 33. The source terminals of most of the MOSFETs are connected to a power FET input 51A of the current mirror section 51, which will be described below, and to the load connection terminal 35, so that the MOSFETs form the power MOSFET 45. The source terminals of the rest of the MOSFETs are connected to a sense FET input 51B of the current mirror section 51, so that the MOSFETs form the sense MOSFET 47. The ratio of the number of MOSFETs constituting the sense MOSFET 47 to the number of MOSFETs constituting the power MOSFET 45 corresponds approximately to a sense ratio.

The current mirror section 51 includes a potential control circuit 53 and a pair of current mirror circuits 55, 55. The potential control circuit 53 is provided for maintaining the output potentials (source potentials) of the power MOSFET 45 and the sense MOSFET 47 to be equal.

The potential control circuit 53 includes an operational amplifier 57 and a FET 59. The FET 59 is provided as a switching element. The negative input of the operational amplifier 57 is connected to the power FET input 51A, while the positive input of the operational amplifier 57 is connected to the sense FET input 51B. The FET 59 is connected between the sense FET input 51B and the external terminal 38, and the output of the operational amplifier 57 is applied to the control terminal. The differential output of the operational amplifier 57 is fed back to the positive input through between the gate and drain of the FET 59.

Due to the feedback of the differential output of the operational amplifier 57, the operational amplifier 57 is maintained in an imaginary short state. In other words, the potentials of the positive input and negative input are maintained almost equal to each other. This maintains the potentials of the drains of the power MOSFET 45 and the sense MOSFET 47 to be equal to each other, and maintains also the potentials of the sources thereof to be equal to each other. Consequently, sense current Is passing through the sense MOSFET 47 can be stably maintained at a constant ratio (the above-stated sense ratio) to a load current IL passing through the power MOSFET 45.

The sense current Is from the potential control circuit 53 passes into an external resistor 61 through the pair of current mirror circuits 55, 55 and through the external terminal 38. The terminal voltage Vo of the external terminal 38 varies with the sense current Is. The terminal voltage Vo is A/D converted and is fed into the microcomputer 25 (see FIG. 1). The microcomputer 25 thus can detect the load current IL passing through the power MOSFET 45 on the basis of the value of the terminal voltage Vo. Thus, the sense MOSFET 47 and the microcomputer 25 function as the detecting section.

The gate driver 49 performs on/off control of the power MOSFET 45 and the sense MOSFET 47 in response to output signals S2 output from the OR circuit 43. Specifically, on receipt of high-level output signals S2 that commands turning on from the OR circuit 43, the gate driver 49 turns on the power MOSFET 45 and the sense MOSFET 47 into the ON (conductive) state. On the other hand, on receipt of low-level output signals 92 that commands turning off, the gate driver 49 turns off the power MOSFET 45 and the sense MOSFET 47 to bring them into the OFF (shut-off) state.

The OR circuit 43 and the AND circuit 41 function as a "switching section" of the present invention. Command signals S3 from the microcomputer 25 are input to the OR circuit 43. Output signals S4 of the AND circuit 41 are also input to the OR circuit 43. The microcomputer 25 outputs the command signals S3 in accordance with a program, which is predetermined in advance, so as to control turning on/off of the power MOSFET 45. This control will be explained below.

The input of the microcomputer 25 is connected through the OR circuit 39 and the connecting terminal 29 to the LAN cable 11. The input of the microcomputer 25 is connected also through the OR circuit 39 and the input terminal 31 (an illustration of an input section) to the switching line 13. In other words: the microcomputer 25 can receive the command signals S1 from the combination switch 3 through the microcomputer 9; and, furthermore, the microcomputer 25 can receive the command signals S1 directly through the switching line 13. Accordingly, even in case the microcomputer 9 is in anormal condition, the microcomputer 25 can receive the command signals S1 that directly reflects the driver's input.

The watchdog 27 (a watchdog timer; an illustration of a monitoring section) is a device for monitoring whether the system is operating normally. Specifically, the watchdog 27 can receive output signals S5 from the microcomputer 25 on a regular basis. When receiving the output signals S5 on the regular basis, the watchdog 27 determines that the microcomputer 25 is in normal condition. On the other hand, when receiving no output signals S5 for a period of certain cycles, the watchdog 27 determines that the microcomputer 25 is in the anormal condition, and then, the watchdog 27 outputs high-level output signals S6 (anomaly signals). The high-level output signals 56 is applied to the AND circuit 41. The AND circuit 41 also receives the command signals S1 from the switching line 13 while level inverting the command signals S1.

(Anomaly that Microcomputer in Engine-Room ECU 7 Determines)

The microcomputer 25 functions as: a determining section that determines whether an anomaly has occurred in the external circuit; and a controlling section that, upon determination by the determining section that no anomaly has occurred, causes the power MOSFET 45 to execute turning on and, upon determination that the anomaly has occurred, causes the power MOSFET 45 to maintain an off state.

Specifically, the microcomputer 25 determines on the basis of the sense current Is whether a fusing anomaly has occurred. The fusing anomaly is anormal condition where, if a fuse element would be provided in the external circuit, the fuse element would be fused. Next, configuration for detecting the fusing anomaly will illustratively be described. The power supply controller 15 of this embodiment has no fuse element in the external circuit; the microcomputer 25 performs control that provides the function same with the function of the fuse element (the fuse function). The microcomputer 25 determines whether the load current IL passing through the power MOSFET 45 is equal to or greater than a threshold current ILth. Then, when the time (which may be either of uninterrupted and intermittent) in which the load current IL is equal to or greater than the threshold current ILth has reached a specified time, the microcomputer 25 determines that the fusing anomaly has occurred.

Figure 3:
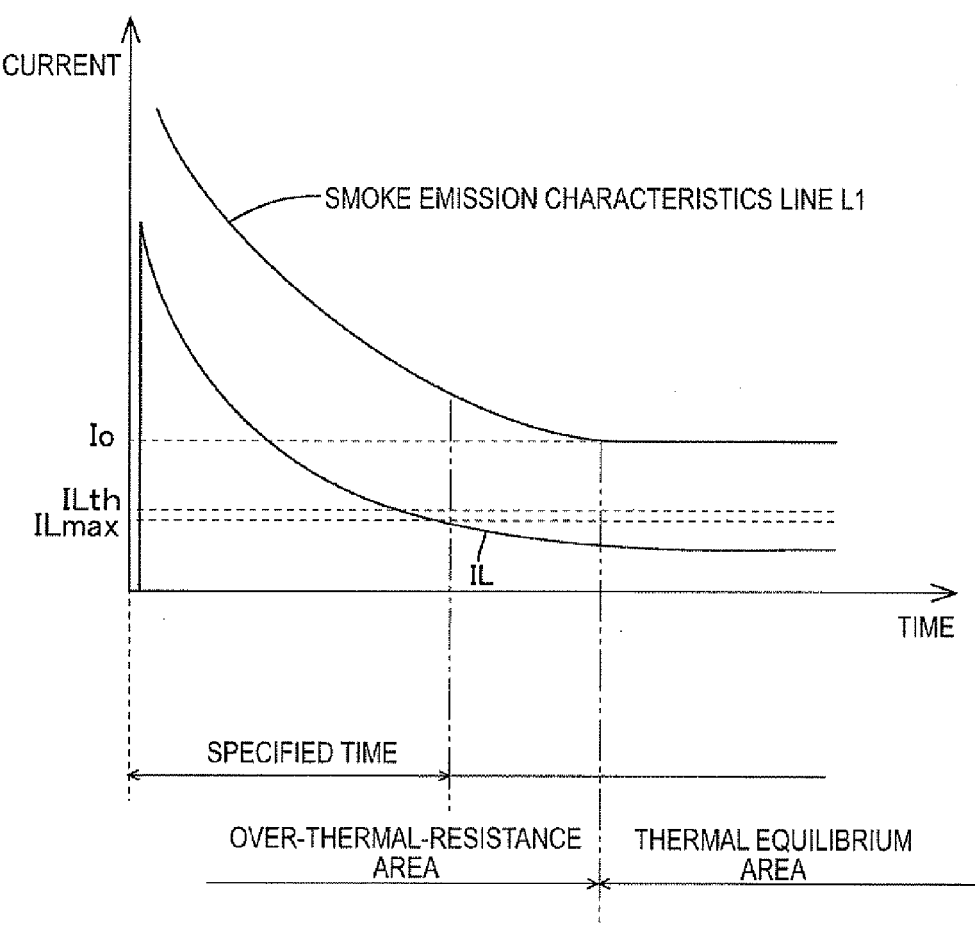
FIG. 3 is a graph for explaining a relationship between set levels of threshold current Ilth and a smoke production characteristic curve.

FIG. 3 is a graph for explaining a relation between a set level of the threshold current ILth and a smoke emission characteristics curve L1. The graph shows the smoke emission characteristics of the electric wire 21 (such as coating material of the electric wire) connectable to the power supply controller 15, which is represented by a smoke emission characteristics curve L1 that represents a constant current level-current applying time (the time taken for fusing) relation. That is, shown in the figure is a smoke emission characteristics curve representing the relation between an arbitrary constant current (one-shot current) and a time taken for the coating material of the electric wire 21 to begin to burn when the current passes through the electric wire 21.

In the graph, ILmax represents the rated current of the load 19 (i.e. a limit of use against which the design thereof is guaranteed). Io represents the equilibrium critical current that can be applied while maintaining a thermal equilibrium state in which heat generation and radiation in the electric wire 21 are balanced. If a current of a higher level than the equilibrium critical current Io is applied, that relates to the over-thermal-resistance area in which a current level and a time taken for smoke emission are substantially in inverse proportion to each other. As illustrated in FIG. 3, the threshold current ILth is set at a level slightly higher than the rated current Ilmax of the load 19.

There is a case such as where a part of the coating material of the electric wire is damaged and the wire contacts the vehicle body at intervals, which is so-called chattering short. In such a case, while high current does not pass, current of a certain level or higher can continuously pass and result in smoke emission of the electric wire 21. The fuse function is effective in such a case.

(Operation of Backup System)
(1) When Microcomputer in Engine-room ECU 7 is in Normal Condition When the condition of the microcomputer 25 in the engine-room ECU 7 is normal, the microcomputer 25 executes predetermined control. Specifically, on turning on of the combination switch 3, the microcomputer 25 initiates on-off control of the power MOSFET 45 and the send MOSFET 47 in response to the ON command signals S1. For example, when the headlight, which is the load 19, has been turned on in the night, the microcomputer 25 maintains the power MOSFET 45 in the ON state.

Furthermore, the microcomputer 25 also suitably reads the value of the terminal voltage Vo so as to determine whether the fusing anomaly has occurred. Specifically, while the determination is that no fusing anomaly has occurred, the microcomputer 25 turns off the power MOSFET 45 in response to the OFF command signals S1 from the combination switch 3 and, thereafter, turns on the power MOSFET 45 in response to the ON command signals S1 from the combination switch 3.

On the other hand, upon determination that the fusing anomaly has occurred, the microcomputer 25 maintains the power MOSFET 45 in the OFF state. Because the microcomputer 25 is in the normal condition then, the watchdog 27 applies low-level output signals (NORMAL signals) S6 to the AND circuit 41. Accordingly, the AND circuit 41 invalidates the command signals S1 from the combination switch 3, so that the signal S1 is not applied to the semiconductor device 23. In other words, direct turning on/off the power MOSFET 45 by the input with the combination switch 3 is unavailable. Instead, the microcomputer 25 holds dominion over the on-off control of the power MOSFET 45.

Accordingly, even if the driver turns on/off the combination switch 3 after occurrence of the fusing anomaly, the OFF state of the power MOSFET 45 is safe from cancellation. The fuse function is thus validly activated.

(2) When Microcomputer in Engine-room ECU 7 Is in Anormal Condition When the condition of the microcomputer in the engine-room ECU 7 has become anormal such as running out of control etc., the watchdog 27 applies the high-level output signals (ANORMAL signals) S6 to the AND circuit 41. Then, the AND circuit 41 validates the command signals SI from the combination switch 3 and applies the command signals S1 to the semiconductor device 23. In other words, direct turning on/off the power MOSFET 45 with the input with the combination switch 3 becomes available, so that the backup function is activated. Furthermore, the output signals S6 from the watchdog 27 is output to the external through the output terminal 37 (an illustration of an alarming section). With this, the anormal condition of the microcomputer 25 can be alarmed by light of a lamp in the driver's console or by voice of a speaker. Note that a line 16 in FIG. 1 indicates the backup line of the present embodiment, while a line 18 in FIG. 4 indicates a conventional backup line.

(Effects Of Present Embodiment)

Figure 4:
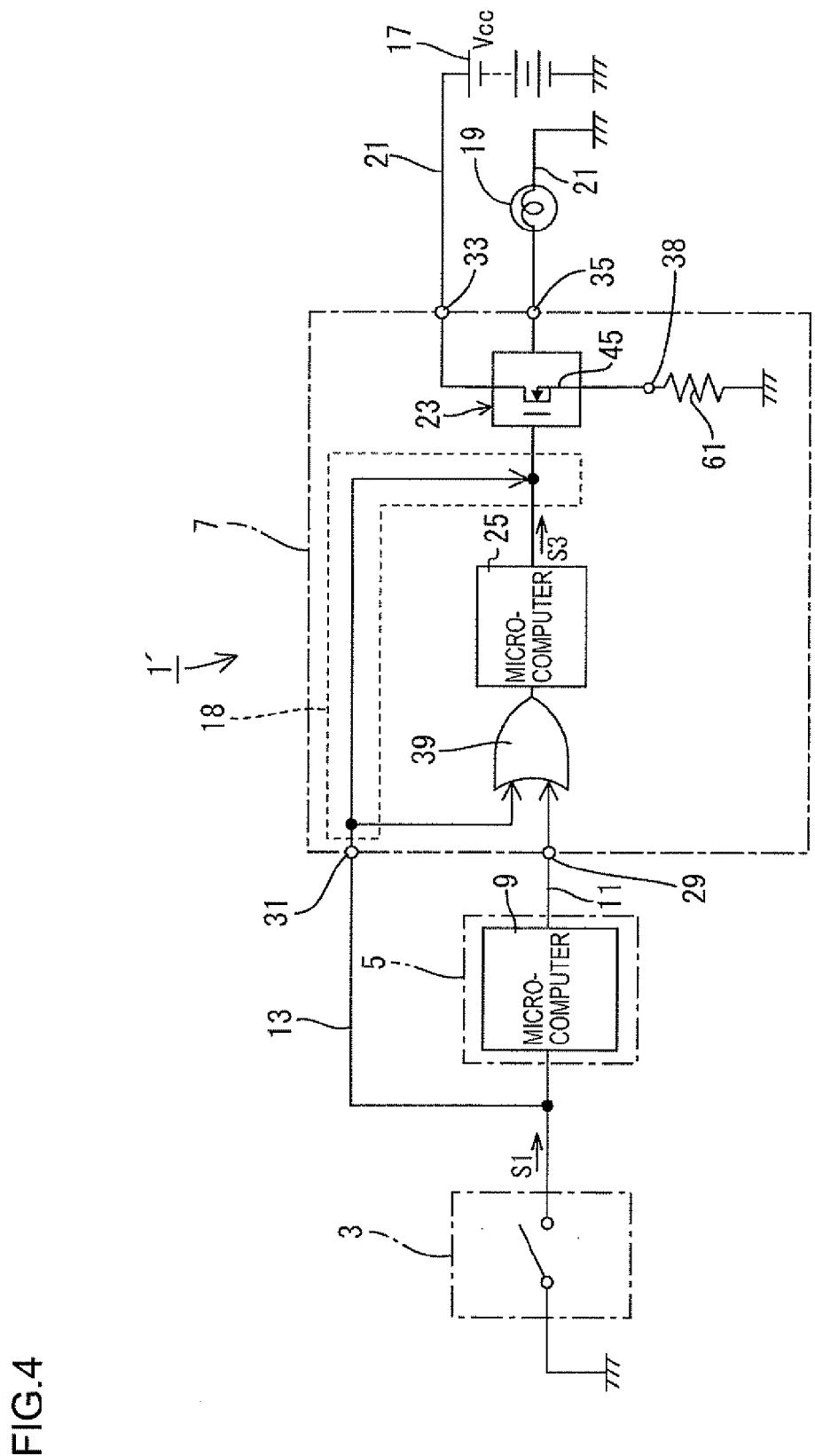
FIG. 4 is a block diagram of general configuration of a backup system of a comparative example.

FIG. 4 is a block diagram illustrating general configuration of a backup system 1' as a comparative example. The configuration identical with the backup system 1 in FIG. 1 is designated by the same reference characters. The backup system 1' applies the command signals S1 from the combination switch 3 directly to the semiconductor device 23. With such a configuration, the backup function can be validly activated when the microcomputer 25 is in the anormal condition. However, with the configuration, the driver can turn on/off directly the power MOSFET 45 by turning on/off the combination switch 3 also when the microcomputer 25 is in the normal condition. Accordingly, even if the microcomputer 25 attempts to maintain the power MOSFET 45 in the OFF state due to occurrence of the fusing anomaly, the driver can cancel the off state by turning on/off the combination switch 3.

The backup system 1 of this embodiment is different from this. When the microcomputer 25 is in the normal condition, the backup system 1 maintains the power MOSFET 45 in the OFF state on occurrence of the fusing anomaly. Then, even if the ON-OFF command signals S1 are input to the input terminal 31, turning on/off of the power MOSFET 45 with the ON-OFF command signals S1 is inhibited. Therefore, the fusing function by the off state can be validly activated. On the other hand, when the microcomputer 25 is in the anormal condition, turning on/off of the power MOSFET 45 with the ON-OFF command signals S1 is allowed. Therefore, the backup function with the ON-OFF command signals S1 can also be validly activated.

<Other Embodiments>

The present invention is not limited to the embodiment explained above with reference to the drawings. For example, the following embodiments are also included within the scope of the present invention.

(1) In the above embodiment, the microcomputer 25 determines whether the detection current based on the sense current IS (the load current IL) has exceeded the threshold current ILth. The present invention is not limited to this. For example, a comparison circuit may be provided in the semiconductor device 23 so that the comparison circuit performs the determination and apply result of the determination to the microcomputer 25. Furthermore, a logic circuit may be provided so that the logic circuit decides whether the fusing anomaly has occurred, and then, the logic circuit applies result of the decision about presence or absence of the fusing anomaly to the microcomputer 25.

(2) In the above embodiment, the microcomputer 25 functions as the controlling section. The present invention is not limited to this. For example, a controlling circuit such as an ASIC may be the controlling section.

(3) In the above embodiment, the current passing through the semiconductor switch is detected by the sense method using the sense FET. The present invention is not limited to this. For example, the current may be detected by shunt method with a shunt resistance provided in the electric wire 21.

(4) In the above embodiment, the "fusing anomaly" is illustrated. The present invention is not limited to this. The anomaly has only to be the anomaly against which the semiconductor switch shall be turned into the off state. For example, the anomaly may be a short-circuiting anomaly of the load 19, a temporal high-current anomaly, or a heating anomaly (a thermal sensing element is used to determine that the anomaly has occurred upon condition that the detected temperature has reached a predetermined temperature).

The invention claimed is:

1. A power supply controller comprising:
   a semiconductor switch that is turned on and off for controlling power supply from a power source to a load;
   a determining section that determines whether an anomaly has occurred in a circuit including the semiconductor switch that is provided in the circuit;
   a controlling section that performs on-off control such that when the determining section determines that no anomaly has occurred, the controlling section causes the semiconductor switch to turn on and off and, when the determining section determines that the anomaly has occurred, the controlling section causes the semiconductor switch to maintain an off state;
   a monitoring section that monitors whether the controlling section itself is in a normal condition or whether the controlling section itself is in an anormal condition;
   an input section whereto an on-off command signal is externally input; and
   a switching section that, when monitoring result output by the monitoring section indicates the normal condition, causes the controlling section to perform on-off control and, when the monitoring result by the monitoring section indicates the anormal condition, causes the semiconductor switch to turn on and off on the basis of the on-off command signal input to the input section.

2. The power supply controller according to claim 1, wherein:
   when the determining section determines that no anomaly has occurred, the controlling section causes the semiconductor switch to turn on and off on the basis of the on-off command signal; and
   when the determining section determines that the anomaly has occurred, the controlling section causes the semiconductor switch to maintain the off state regardless of the on-off command signals.

3. The power supply controller according to claim 1, further comprising:
   a detecting section that detects current passing through the semiconductor switch, wherein:
   on the basis of a detecting result by the detecting section, the determining section determines whether the anomaly has occurred in the circuit including the semiconductor switch that is provided in the circuit.

4. The power supply controller according to claim 2, further comprising:
   a detecting section that detects current passing through the semiconductor switch, wherein:
   on the basis of a detecting result by the detecting section, the determining section determines whether the anomaly has occurred in the circuit including the semiconductor switch that is provided in the circuit.

5. The power supply controller according to claim 1, further comprising:
   an alarming section that externally outputs an alarm signal indicating the anormal condition.

6. The power supply controller according to claim 2, further comprising:
   an alarming section that externally outputs an alarm signal indicating the anormal condition.

7. The power supply controller according to claim 3, further comprising:
   an alarming section that externally outputs an alarm signal indicating the anormal condition.

8. The power supply controller according to claim 4, further comprising:
   an alarming section that externally outputs an alarm signal indicating the anormal condition.

* * * * *